B. PICKERING.
TOY WAGON.
APPLICATION FILED JUNE 12, 1918.
1,294,303.
Patented Feb. 11, 1919.
2 SHEETS—SHEET 1.
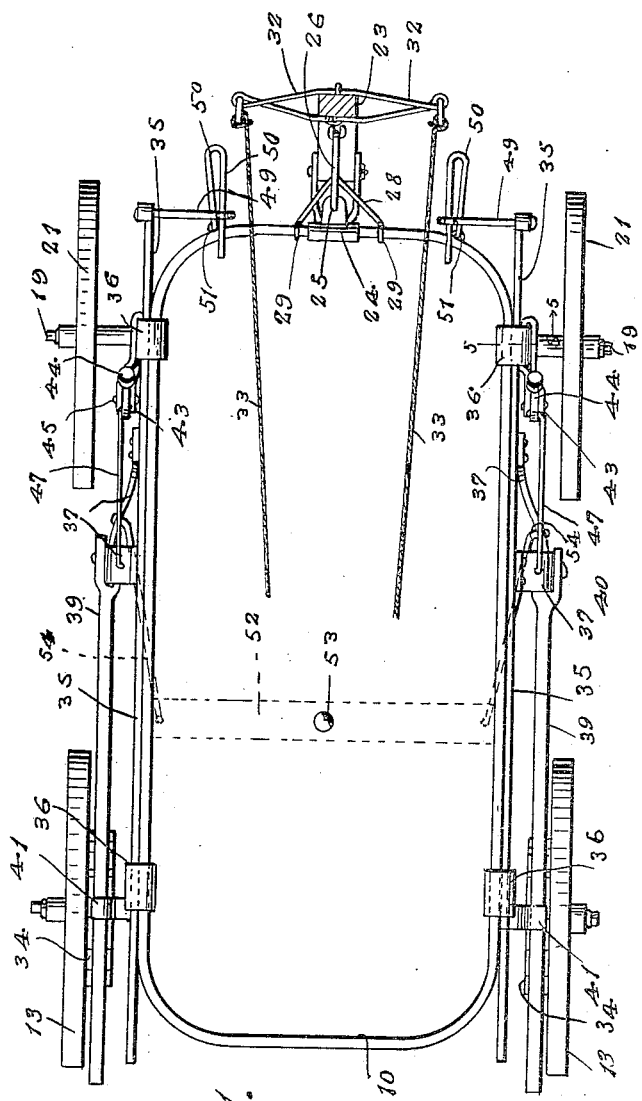
Fig. 1.
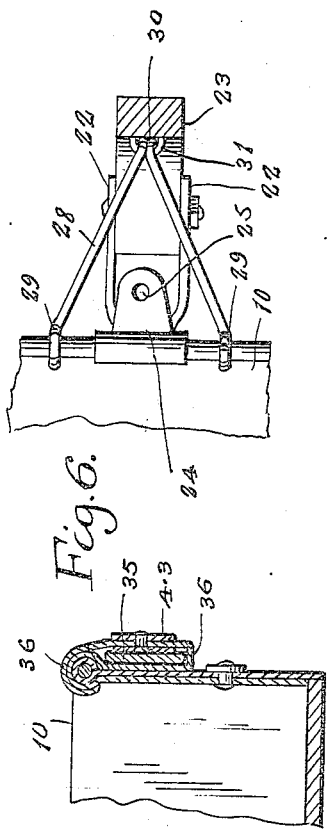
Fig. 6.
Fig. 5.
Inventor
B. Pickering.

B. PICKERING.
TOY WAGON.
APPLICATION FILED JUNE 12, 1918.
1,294,303.
Patented Feb. 11, 1919.
2 SHEETS—SHEET 2.
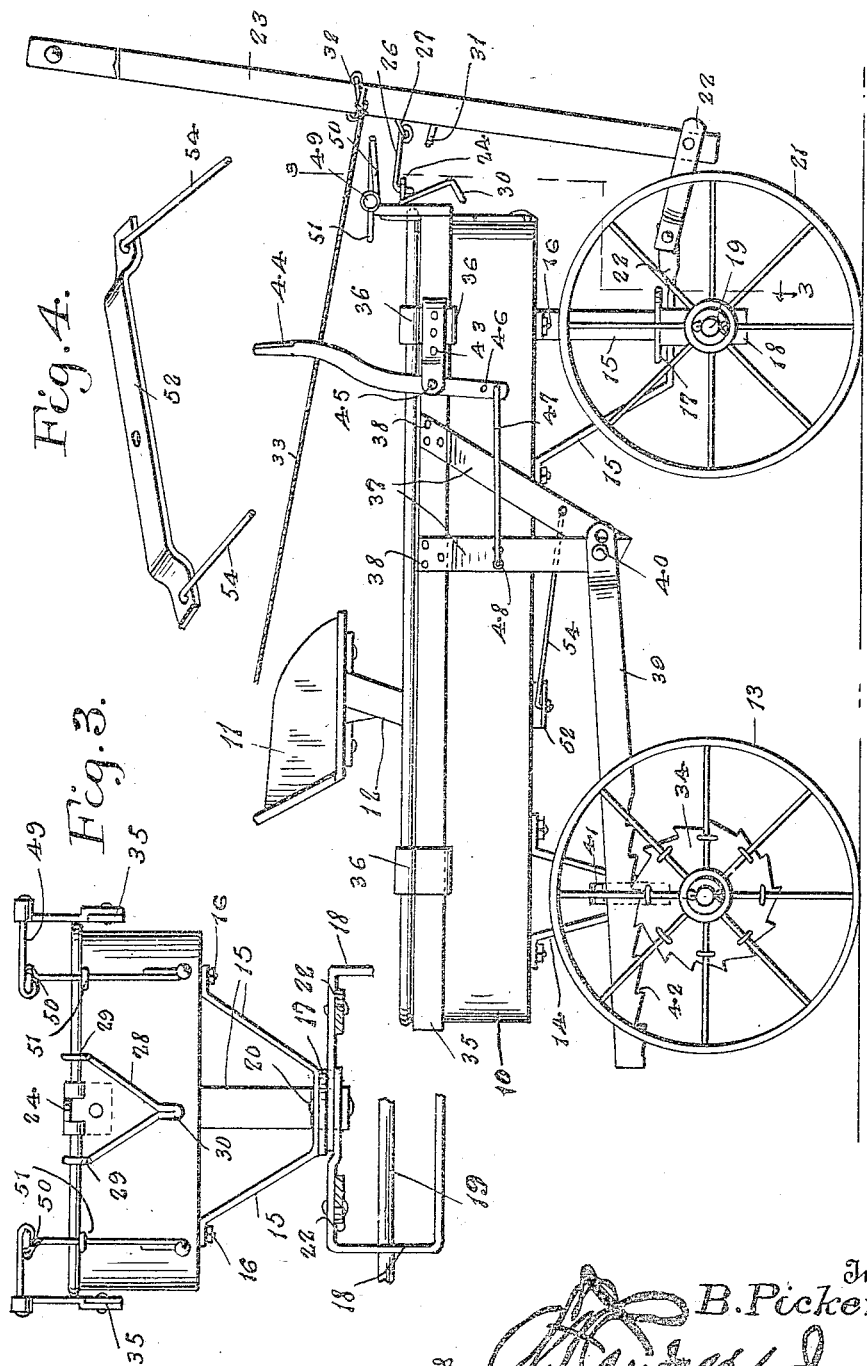
Inventor
B. Pickering.
By
Attorney

UNITED STATES PATENT OFFICE.

BYRON PICKERING, OF KISSIMMEE, FLORIDA.

TOY WAGON.

1,294,303.  Specification of Letters Patent.  Patented Feb. 11, 1919.

Application filed June 12, 1918. Serial No. 239,544.

*To all whom it may concern:*

Be it known that I, BYRON PICKERING, a citizen of the United States, residing at Kissimmee, in the county of Osceola and State of Florida, have invented certain new and useful Improvements in Toy Wagons; and I do hereby declare the following to be a full, clear, and exact description of the invention, such as will enable others skilled in the art to which it appertains to make and use the same.

My invention relates to vehicles of the manually propelled type.

An important object of this invention is to provide a manually propelled vehicle for use by children as a source of pleasure and exercise.

A further object of the invention is to provide a manually propelled vehicle of the type described adapted to be propelled by either a movement of the feet or of the arms as may be desired.

A further object of the invention is to provide a vehicle of the class described which is neat in appearance, safe for children to use and cheap to manufacture.

Other objects and advantages of the invention will be apparent during the course of the following description.

In the accompanying drawings forming a part of this specification and in which like numerals are employed to designate like parts throughout the same, Figure 1 is a plan view of a vehicle embodied in my invention, Fig. 2 is a side elevation of the same, Fig 3 is a vertical transverse section taken on line 3—3 of Fig. 2, Fig. 4 is a perspective of an evener adapted to operate in connection with the propelling mechanism, Fig. 5 is a section taken on line 5—5 of Fig. 1, and Fig. 6 is an enlarged plan view of a part of the steering mechanism.

In the drawings, wherein for the purpose of illustration is shown the preferred embodiment of my invention, the numeral 10 designates the frame of the vehicle having a seat 11 arranged therein and supported by legs 12. Rear wheels 13 rotatably mounted on axles secured to V-shaped standards 14, are adapted to afford traction for the vehicle and receive power from a source to be fully hereinafter described. A hound 15 arranged in the forward part of the frame is secured to the under side thereof by bolts 16. A bearing plate 17 is secured to the upper surface of a sand board 18 mounted on an axle 19. It will be apparent that a pivotal movement of the axle 19 may be effected by virtue of a pivot 20 extending through the bearing plate 17 and the hound 15. Wheels 21 are rotatably carried by the forward axle 19. An arm 22 extends forwardly from the sand board 18 and has pivotal connection with a coupling 22. The coupling 22 is connected with a shaft 23. A lip 24 secured to the forward part of the frame 10 and arranged centrally thereof is provided with an aperture 25. A hook 26 secured to the shaft 23 by an eyelet 27 is provided at its free end with a hook adapted to engage the aperture 25 of the lip 24. By engaging the hook 26 with the lip 24 it will be apparent that the shaft 23 is held in upright position and permits of the free steering of the vehicle. A forked hook 28 is pivotally secured to the forward portion of the frame 10 as at 29 and is provided at its forward end with a hook 30 adapted to engage an eye 31 carried by the shaft 23 and below the eye 27. The forked hook 28 is engaged with the eye 31 when it is desired to direct the vehicle in a straight course, without the necessity of steering the same. As clearly shown in Fig. 1, stirrups 32 are arranged on opposite sides of the shaft 23 and permit of the steering of the vehicle by the feet of the operator. The outer end portions of the stirrups 32 are provided with apertures for the reception of the ends of reins 33 to permit of the vehicle being steered by hand. In either case, the hook 26 is engaged with the lip 25 to permit of the free steering of the vehicle.

As clearly shown in Fig. 2, the rear wheels 13 are provided with ratchet gears 34. A propelling mechanism comprising a slidable bar 35 extending longitudinally of the sides of the frame and slidably arranged in brackets 36 carries depending arms 37 secured thereto as at 38. A rack 39 having its forward end bifurcated extends over the opposite sides of the arms 37 and is pivotally secured thereto by pivots 40. The rear portion of the rack 39 extends through guides 41 and is provided on the lower edge thereof with ratchet teeth 42 adapted to engage the ratchet gears 34. The forward brackets or guides 36 have rigidly secured thereto, V-shaped arms 43 extending rearwardly therefrom and having pivotal connection with hand operating levers 44 as at 45. The lower portions of the levers 44 are provided with apertures 46 adapted for the reception of one end of rods 47. The rods 47 extend rearwardly to and connect with the arms 37 as at 48. With reference to Fig. 2, it will be apparent that the operation of the lever 44, will cause the longitudinally extending rod 35 to partake of a reciprocatory movement, thus causing the racks 39 to partake of a like movement and thus propel the wheels 13. As clearly shown in Fig. 1, the forward end portions of the slidable bars 35 are provided with stirrups 49 adapted for the reception of the feet in assisting in the propelling of the vehicle. The inner portions of the stirrups 49 operate in guards secured to the forward portion of the frame as at 51. An evener designated by the numeral 52 is pivotally secured to the frame between its ends as at 53. The end portions of the evener 52 are provided with pivoted rods 54 extending therefrom and connected at their forward ends to the depending arms 37. It will be apparent that the particular function of the evener 52 is to equalize the propelling force of the vehicle and serve to return the propelling mechanism on each side of the vehicle to its forward position, alternately.

The operation of my improved vehicle is as follows:

The operator places himself in the seat 11 and grasps the handle 44. To propel the vehicle he causes the handles or levers 44 to partake of oscillatory movements in opposite directions. With reference to Fig. 1, it will be apparent that this movement of the levers 44 in opposite directions will cause one of the racks 39 to be in forward position while the other rack 39 is in a rearward position, thus causing an even flow of power to the wheels. To alternately cause the racks 39 to assume forward positions, the rack in a forward position causes the evener 52 to force the rack in a rearward position forwardly. The feet may be engaged with the stirrups 49 to assist in the propelling of the vehicle. The stirrup on the right of the operator will partake of a movement in the opposite direction from the lever on the right of the operator, thus when the lever is partaking of a forward movement, the stirrup will partake of a rearward movement. As in the case of the lever and stirrup on the right of the operator, the lever and stirrup on the left of the operator will partake of movements in opposite directions.

Should it be desired to propel the vehicle solely by the movement of the feet, the levers 44 may be released and the vehicle steered by the reins 33. Should it be desired to propel the vehicle only by means of the arms, the vehicle may be steered by engaging the feet with the stirrups 32. In either case, however, the hook 26 is engaged with the lip 24 to permit of the free steering of the vehicle. Sould it be desired to direct the vehicle in a course directly forward, the forked hook 28 is engaged with the eye 31, thus retaining the shaft 23 in a set position. With reference to Fig. 2 it will be seen that the power is conveyed to the rack 39 by the reciprocatory movement of the longitudinal bars 35.

While I have shown and described the preferred embodiment of my invention, it is understood that I may make such minor changes in arrangement and construction of parts as will remain within the spirit of the invention and the scope of the appended claims.

Having thus described my invention, what I claim is:

1. A vehicle of the class described comprising, a frame; wheels rotatably carried by the frame; ratchet gears carried by certain of the wheels; slidable bars carried by opposite sides of the frame; rack bars arranged above the ratchet gears and adapted for engagement therewith; depending rods carried by the slidable bars and connected with the rack bars; and means to cause the slidable bars to partake of reciprocatory movements in opposite directions.

2. A vehicle of the class described comprising, a frame; wheels rotatably carried by the frame; ratchet gears having rigid connection with the rear wheels of the vehicle; slidable bars carried by opposite sides of the frame; rack bars carried above the ratchet gears and adapted for engagement therewith; depending rods connecting the slidable bars with the rack bars; an evener connecting the depending rods on opposite sides of the frame; and means to cause the slidable bars to partake of reciprocatory movements in opposite directions.

3. A vehicle of the class described comprising, a frame; wheels rotatably carried by the frame; ratchet gears carried by certain of the wheels; slidable bars carried by opposite sides of the frame; rack bars arranged above the ratchet gears and adapted for engagement therewith; depending rods connecting the slidable bars with the rack bars; and levers pivotally secured to opposite sides of the frame and adapted to cause the slidable bars to partake of reciprocatory movements in opposite directions.

4. A vehicle of the class described comprising, a frame; wheels rotatably carried by the frame; ratchet gears carried by certain of the wheels; slidable bars carried by the opposite sides of the frame; rack bars arranged above the ratchet gears and adapted for engagement therewith; depending rods connecting the slidable bars with the rack bars; levers pivotally secured to the opposite sides of the frame and connected with the depending bars; and foot stirrups secured to the forward end portions of the slidable bars, said levers and foot stirrups being adapted to cause the slidable bars to partake of reciprocatory movements in opposite directions.

5. A vehicle of the class described comprising, a frame; wheels rotatably carried by the frame; ratchet gears carried by certain of the wheels; slidable bars carried by opposite sides of the frame; ratchet bars arranged above the ratchet gears and adapted for engagement therewith; an evener pivotally secured to the frame and having connection with the slidable bars; levers pivotally secured to the opposite sides of the frame and having connection with the slidable bars; and foot stirrups secured to the forward portions of the slidable bars, said pivoted levers and foot stirrups being adapted to cause the slidable bars to partake of reciprocatory movements in opposite directions.

6. A vehicle of the class described comprising, a frame; wheels rotatably carried by the frame; ratchet gears carried by certain of the wheels; slidable bars carried by opposite sides of the frame; rack bars arranged above the ratchet gears and adapted for engagement therewith; depending rods connecting the slidable bars with the rack bars; an evener pivotally secured between its ends to the frame; rods connecting the pivoted evener to the depending rods; levers pivotally secured to the opposite sides of the frame; stirrups secured to the forward portions of the slidable bars, said pivoted levers and stirrups being adapted to be operated to cause the bars to partake of reciprocatory movements in opposite directions; and means to steer the vehicle.

In testimony whereof I affix my signature in presence of two witnesses.

BYRON PICKERING.

Witnesses:
H. M. BREAKER,
WILLIAM R. BROWN.

Copies of this patent may be obtained for five cents each, by addressing the "Commissioner of Patents, Washington, D. C."